Figure 1:
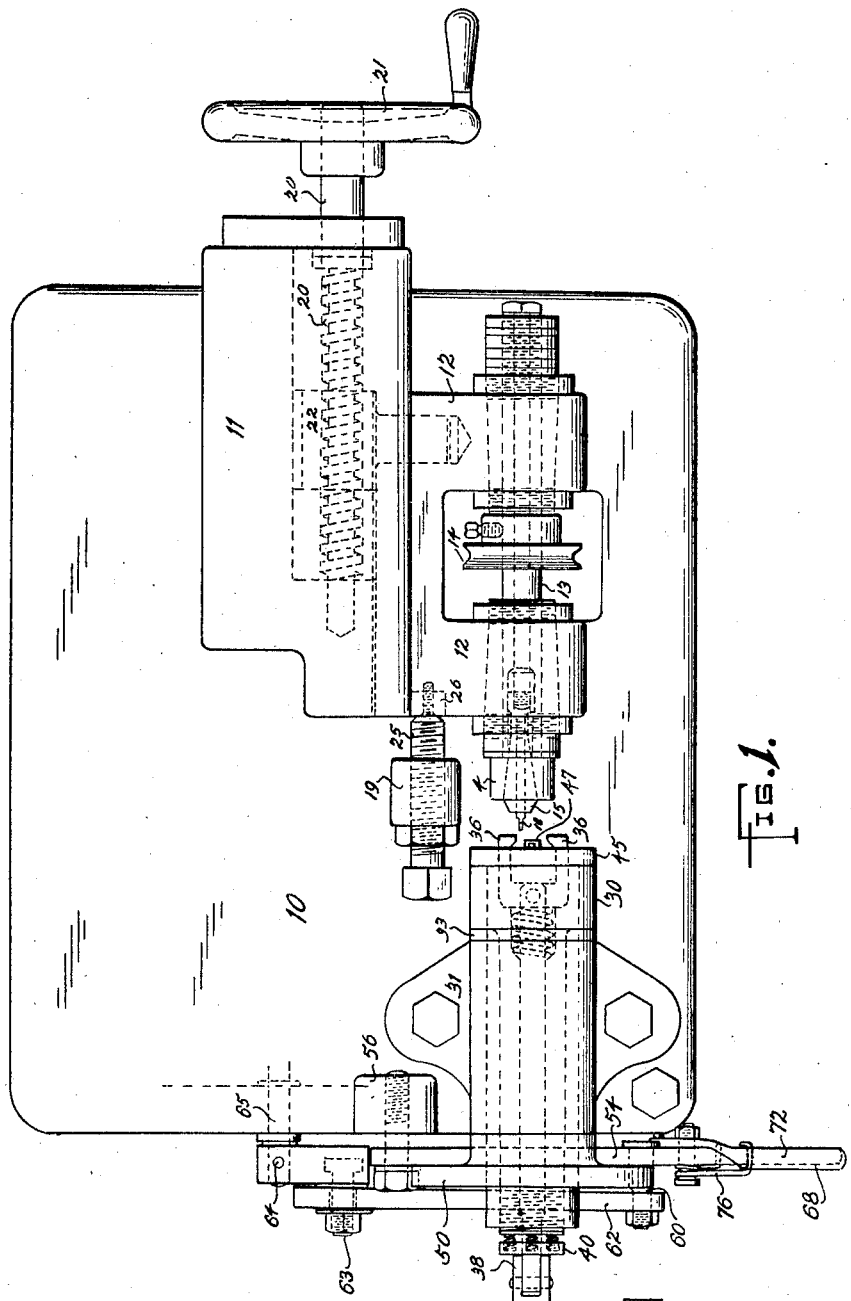

G. T. TRUNDLE, Jr.
MILLING MACHINE.
APPLICATION FILED FEB. 23, 1918.

1,358,040.

Patented Nov. 9, 1920.
3 SHEETS—SHEET 1.

Inventor:
George T. Trundle Jr.
By Baker & Macklin, Attys.

G. T. TRUNDLE, Jr.
MILLING MACHINE.
APPLICATION FILED FEB. 23, 1918.
1,358,040.
Patented Nov. 9, 1920.
3 SHEETS—SHEET 2.
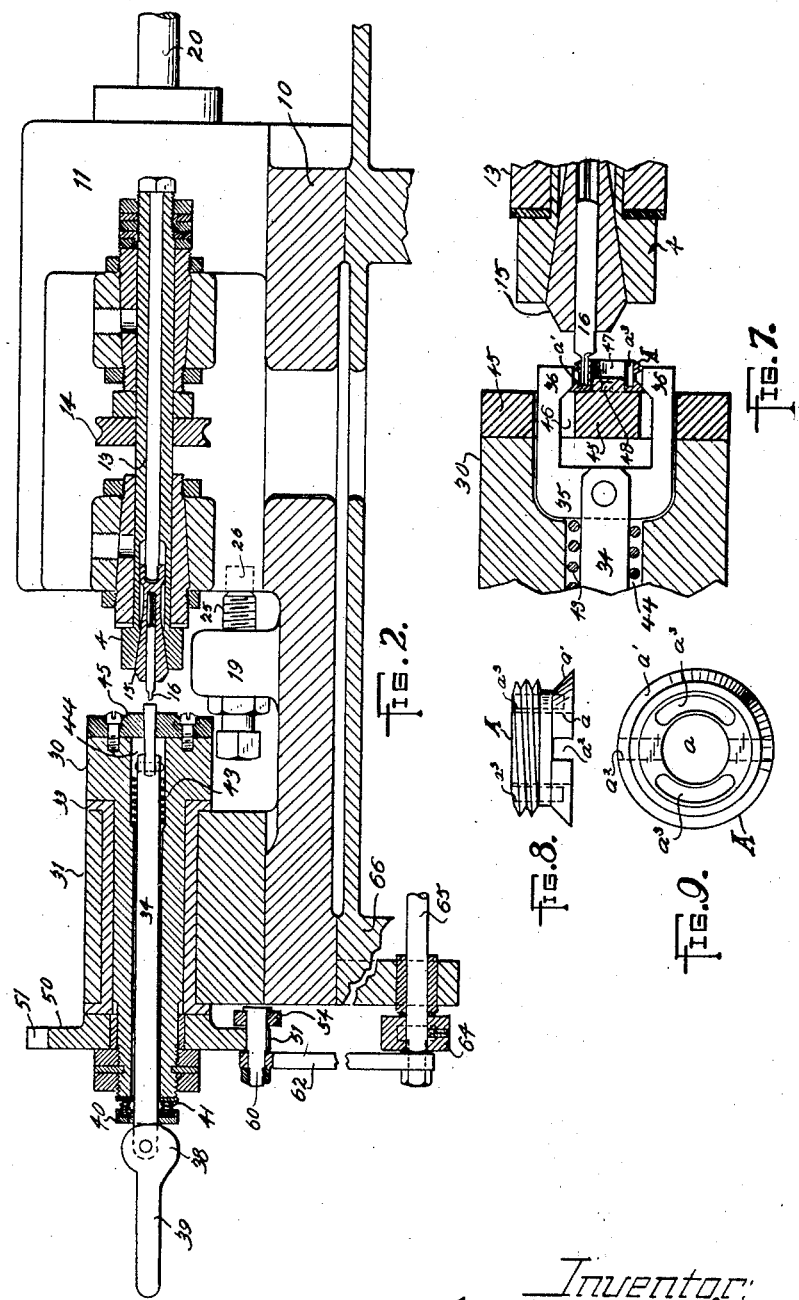

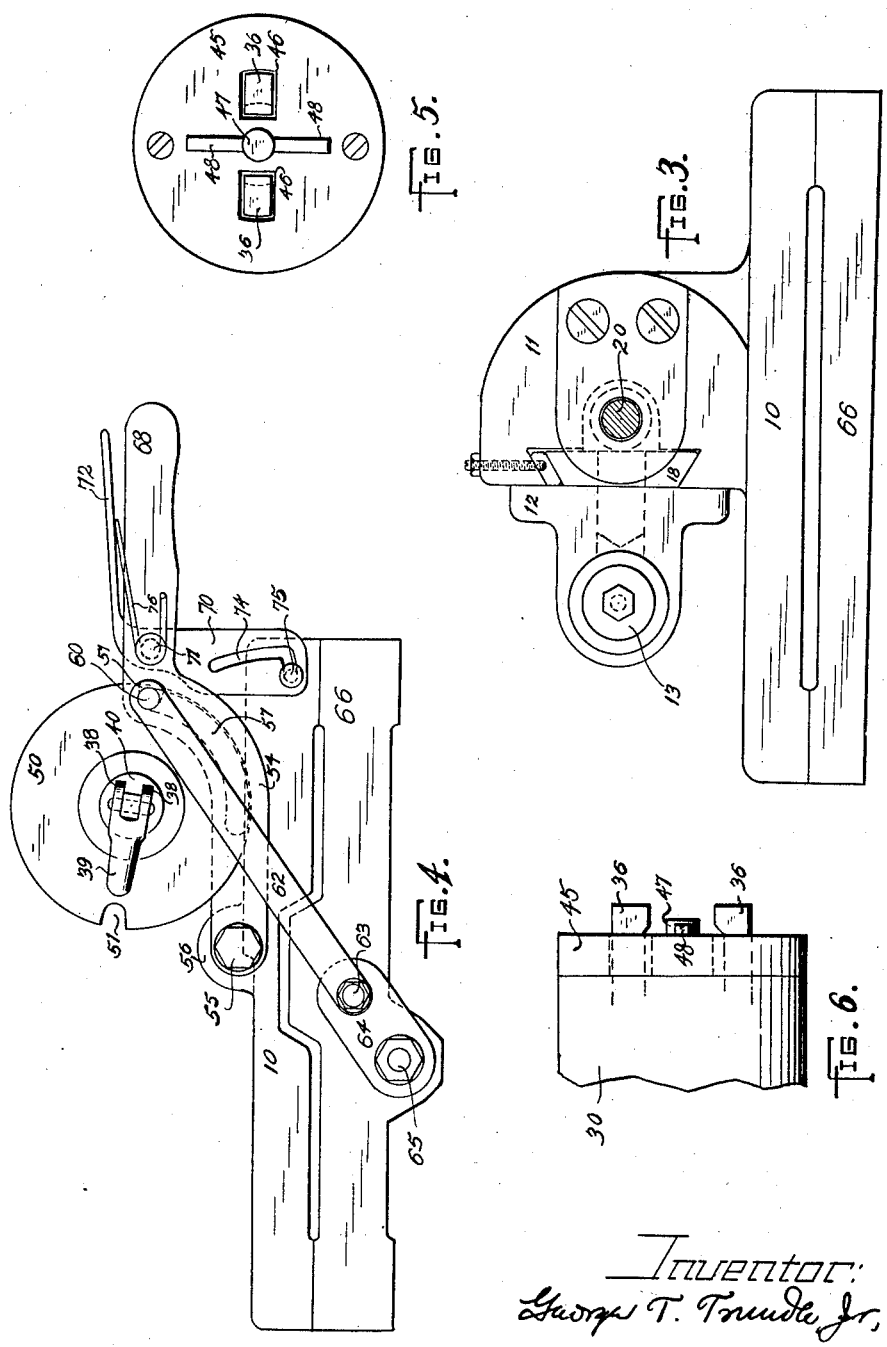

UNITED STATES PATENT OFFICE.

GEORGE T. TRUNDLE, JR., OF CLEVELAND, OHIO, ASSIGNOR TO THE AMERICAN MULTIGRAPH COMPANY, OF CLEVELAND, OHIO, A CORPORATION OF OHIO.

MILLING-MACHINE.

1,358,040.   Specification of Letters Patent.   Patented Nov. 9, 1920.

Application filed February 23, 1918. Serial No. 218,850.

*To all whom it may concern:*

Be it known that I, GEORGE T. TRUNDLE, Jr., a citizen of the United States, residing at Cleveland, in the county of Cuyahoga and State of Ohio, have invented a certain new and useful Improvement in Milling-Machines, of which the following is a full, clear, and exact description, reference being had to the accompanying drawings.

The object of this invention is to provide a simple and efficient mechanism for milling arcual grooves in suitable blanks, as for example, in certain parts of time fuses. My mechanism includes a rotary spindle carrying a suitable end mill, an oscillatory chuck which may carry the blank opposite the end of the cutter, and means for feeding the cutter longitudinally into the blank while the latter is oscillating. My invention includes also the means for yieldingly clamping the blank to the oscillatory work holder, the means for oscillating such work holder, and the means for readily changing the presentation of the blank to the milling cutter, to enable the cutting of a plurality of independent grooves. My invention is hereinafter more fully described in connection with the drawings, and the essential characteristics are summarized in the claims.

In the drawings, Figure 1 is a plan of my milling machine, the clamping handle for the chuck being partly broken away; Fig. 2 is a vertical section along the axis of the chuck and milling cutter, being accordingly on an offset plane; Fig. 3 is a sectional elevation of the machine looking from the right hand end; Fig. 4 is an elevation looking from the left hand end; Fig. 5 is a view looking at the inner end of the work spindle; Fig. 6 is a side elevation of the inner end portion of the work spindle; Fig. 7 is a horizontal section through the chucks of the work spindle and cutter, being in the plane of the rotary axes; Fig. 8 is a side elevation and Fig. 9 a plan of a simple fuse part having arcual grooves adapted to be cut by the mechanism of Figs. 1 to 7.

As shown in Figs. 1 to 4, 10 indicates a suitable bed plate rigidly carrying a standard 11 on which a carriage 12 is slidably guided. As shown, the carriage 12 has a dove-tailed rib 18 which engages a guide-way in the standard. The carriage is shown as having two arms in which is journaled a rotary spindle 13 carrying a pulley 14 by which it may be rotated. At the inner end of this spindle is a collet 15 for clamping the cutter 16, which consists of an end mill.

To move the spindle longitudinally, I mount in the standard 11 a rotary screw 20 having an operating crank 21 and I secure to the carriage 12 a nut 22 on the screw. A suitable stop is provided to limit the movement of the carriage. Such stop is shown in the form of a screw 25 threaded through a lug 19 on the bed plate and bearing against a hardened block 26 mounted in the carriage 12.

Opposite the end of the cutter spindle, but out of axial alinement with it, is a work spindle 30 mounted in the standard 31 secured to the bed 10. As shown in Fig. 2 the work spindle comprises a suitable sleeve extending through the standard, there being an interposed bearing sleeve 33.

The center of the work spindle is hollow and is occupied by a shiftable rod 34, which, at its forward end, engages a yoke 35 carrying a pair of jaws 36 formed with reference to the work to be clamped. At its outer end the rod 34 carries a pivoted cam 38 having an operating handle 39. The cam is shown as bearing against a plate 40 which is pressed away from the end of the sleeve 30 by suitable interposed compression springs 41. This enables the cam to apply a spring tension to the jaws. A compression spring 43 surrounds the bar 40 between the yoke 35 in an enlarged bore 44 of the spindle and is compressed between the base of such enlargement and the yoke 35. This spring has a greater throw than the springs 41 (the extension of which is limited) and serves to release the jaws when the cam 38 allows it.

As shown in Figs. 2, 5, 6 and 7, there is mounted on the inner end of the spindle 30 a plate 45 having openings 46 through which the jaws 36 extend. This plate is formed with projections on its face adapted to position the blank. As shown in the drawing, it has a central stud 47 and a pair of radial ribs 48.

The form of the jaws and of the face plate projections is chosen with reference to the article to be clamped. Figs. 8 and 9 illustrate an article which the jaws and face plate in Figs. 5, 6 and 7 may readily clamp. This article comprises a screw-threaded plug A having a central bore $a$, a conical head $a'$ and a pair of diametrically opposed radial notches $a^2$ extending through the head to the bore.

With the machine as shown, such a blank as just described is placed against the face plate 45 with the central stud 47 occupying the bore $a$ and the ribs 48 entering the notches $a^2$. When the blank is being placed, the jaws 36 are some distance away from the face plate 45 and the blank is put into position between the two arms of the yoke 35. After the blank is in place the tightening of the cam 38 causes the jaws 36 to seat on the inclined head $a'$ and effectively clamp the blank to the face plate 45. At the same time the springs 41 prevent the jaws 36 engaging the head $a'$ with sufficient force to injure it.

It is the object of the specific mechanism shown to mill arcual grooves into the head of the blank A between the central bore $a$ and the screw thread. To effect this, I provide means for oscillating the work spindle 30 about its axis by an amount corresponding to the length of the groove to be milled. After one groove has been milled the withdrawal of the cutter enables the work spindle to be turned to bring a fresh portion of the blank opposite the cutter.

As shown in Fig. 9, the finished article A has two diametrically opposed arcual grooves $a^3$, each extending for about ninety degrees. To mill such grooves the spindle is given an oscillation through a range of about ninety degrees to enable one groove to be milled and then after the cutter has been withdrawn the spindle is given a half rotation and again oscillated through a range of about ninety degrees. The oscillating mechanism is shown in Figs. 1, 2 and 4 and will now be described.

Rigid on the end portion of the sleeve 30 beyond the standard 31 is a disk 50 having in its edge a pair of diametrically positioned notches 51. Pivoted at 55 to a boss 56 rising from the bed plate is a guide bar 54 which stands between the disk 50 and the end of the bed plate. This guide bar has an arcual slot 57 which is struck about a radius corresponding to the distance from the center of the work spindle to the center of one of the notches 51. The arcual slot 57 therefore may lie alongside of the disk 50 with the outer edge of the slot about alining with the periphery of the disk. 60 indicates a pin which is slidably mounted in the slot 57 and is adapted to occupy one of the notches 51 and project to the other side of the disk. At such other side this pin is mounted in a link 62 which is pivoted at its other end at 63 to a crank arm 64 on an operating shaft 65. This shaft is suitably journaled in a portion of the frame (as for example the sub-base 66) and is rotated in any suitable manner.

The rotation of the shaft 65 rotates the crank 64, which, by reason of the link 62, reciprocates the pin 60 in the slot 57. If the bar 54 carrying this slot is in the position shown in Fig. 4 the pin 60 will occupy one of the notches 51 so that its reciprocation will turn the disk 50 and hence the work spindle about the axis thereof substantially ninety degrees in one direction and back to the initial point for each rotation of the shaft 65.

It will be seen that the mechanism described provides very convenient means for oscillating the work spindle throughout the range required for cutting the groove $a^3$ of the desired length. During such oscillation the cutter is fed into the work by the rotation of the hand crank 21 until the milling of one of the slots $a^3$ is completed, when the cutter is withdrawn by reverse rotation of the hand crank.

When the cutter has been withdrawn after milling one of the slots $a^3$ it is desired to give the work spindle a half rotation to present another portion of the blank to the cutter. This is accomplished by moving the lever 54 downwardly about its pivot 55 to carry the pin 60 out of the notch 51. This leaves the work spindle and the disk 50 entirely free and the same may be turned by hand to the new position, the operator taking hold of the handle 39 or the projecting end 30 of the spindle as is more convenient. After the disk has been given approximately a half turn the slotted lever 54 is returned to engaging position and the pin 60 comes into the other notch 51, thereby properly oscillating the blank to enable the milling of the other groove $a^3$.

To effectively lock the slotted lever 54 in its engaging position, and also allow it to be readily moved therefrom when desired, I provide it with a locking dog in the form of a bell-crank 70 pivoted to it at 71 and extending above and approximately parallel with a hand portion 68 of the bar. The lower arm of the bell-crank 70 has an L-shaped slot 74 which is adapted to engage a stationary pin 75 projecting from the bed 10. A suitable spring 76 tends to maintain the handle portion of the bell-crank elevated, as shown in Fig. 4. In this position the offset portion of the slot 74, extending above and below the stationary pin 75, locks the slotted bar in its elevated position and thus holds the pin 60 in engagement with one of the notches 51.

When the pin 60 is to be freed from a notch of the oscillating head, the operator grasps the handles 68 and 72 and squeezes them together, thus swinging the slotted bell-crank arm 70 toward the rear and bringing into registration with the pin 75 a portion of the slot 74 which is then concentric of the axis 55. With the locking dog in this position it ceases to hold the slotted bar elevated and the bar and dog may therefore be depressed to free the pin 60 from the notch 51.

It is to be understood that the pin 60 will only pass out of the notch 51 or into such notch when the pin 60 is in the lower portion of the slot 57. However, the oscillations are rapid enough so that the operator need pay no attention to the particular position of the pin when he takes hold of the handles 68 and 72. He disengages the locking handle as soon as he takes hold of it and applies a pressure to the handle 68 which becomes effective as soon as the continuously moving connecting rod 62 brings the pin into the lowermost portion of the slot, where the movement about the axis 55 substantially coincides with the radius of the disk. The notches 51 are slightly flaring to prevent binding and to allow some range to this movement.

In operation, the operator throws the cam lever 39 to open the chuck and puts the blank in place with his fingers and then clamps it by turning the lever 39 toward the spindle. If the spindle is not standing with one of the notches 51 approximately at the lowermost position, the operator turns the spindle into such position. He then presses up on the handle 68 and as soon as the pin 60 comes into registration with the bottom notch 51 it engages the same and the oscillation of the blank starts. The release of the handle 72 by the operator locks the bar 54 in the elevated position.

The operator now feeds the cutter carriage gradually toward the left by rotation of the hand crank 21, whereby the end-mill 16 mills the groove as the work spindle oscillates. The feeding of the cutter is continued until the carriage is brought to a stop by abutting the screw 25 which has been positioned according to the depth of the groove desired. This completes one groove. Then the carriage is withdrawn by the reverse rotation of the hand crank 21.

The operator now takes hold of the handles 68 and 72, squeezing them together and applying a downward pressure, which results in depressing them and carrying the pin 60 free from the disk, as soon as it reaches the bottom of its stroke. Then the operator gives a half rotation to the work spindle, raises the handles 68 and 72, and operates the cutter spindle as before to mill the other groove $a^3$. At the completion of this groove and the withdrawal of the cutter, the handles 68 and 72 are again dropped, stopping the rotation of the work spindle, and the cam handle 39 is turned out to loosen the jaws 36 to release the finished article.

Having thus described my invention, what I claim is:—

1. In a milling machine, the combination of a rotary spindle adapted to carry a cutter, a chuck adapted to carry a blank opposite the end of the cutter, mechanism for automatically oscillating the chuck and means for continuously rotating the cutter.

2. In a milling machine, the combination of a continuously rotating cutter spindle, a work spindle out of axial alinement with the cutter spindle, automatically operating means for oscillating the work spindle, and means for causing relative feeding movement between the cutter carried by the cutter spindle and the blank carried by the work spindle.

3. In a milling machine, the combination of a rotary spindle adapted to carry an end mill, a work spindle positioned beyond the end of the cutter spindle but out of axail alinement therewith, means for clamping a blank on the end of the work spindle, automatically operating means for oscillating the work spindle, and means for feeding the cutter spindle toward the blank during the oscillation.

4. In a milling machine, the combination of a rotary spindle, means for carrying an end mill at one end of the spindle, a shiftable carriage carrying said spindle, a work holder having a movable clamping jaw, mechanism for automatically oscillating the work holder during the cutting operation, and means for moving the carriage toward the work holder.

5. The combination of a rotary spindle adapted to carry a cutter, a work holding spindle out of axial alinement with the cutter spindle, means for clamping a blank axially on the end of the work holding spindle, means for moving the cutter into and out of engagement with the blank, a continuously moving reciprocatory device, and mechanism for causing said device to engage the work spindle or for freeing it therefrom as desired.

6. The combination of a rotary spindle adapted to carry a cutter, a work holding spindle, means for clamping a blank axially on the end of the work holding spindle and out of axial alinement with the cutter, means for moving the cutter into and out of engagement with the blank, a head on the work spindle, a guide adjacent to the head, means continuously reciprocated along said guide and adapted to be engaged to the head or be free therefrom according to the position of the guide, and means for moving the guide and for holding it in engaging position.

7. The combination with the spindle adapted to carry a cutting tool, of a spindle to carry the work, a head on said work spindle, a member adapted to engage the head, an arcuate guide for said member, means for moving the guide to carry the member into or out of engagement with the head, and means for reciprocating said member along the guide.

8. The combination with a spindle provided with means for carrying a blank, of a notched head on said spindle, a pin adapted to occupy a notch in the head, an arcuate guide for said pin, means for moving the guide to carry the pin toward or from the notched head, and means for reciprocating the pin along the guide.

9. The combination of a spindle having a notched head, a movable member having an arcuate slot adjacent to the edge of the head, a pin occupying said slot and adapted to engage a notch of the head or clear it according to the position of said member, and means for reciprocating the pin in the slot.

10. The combination of a spindle provided with means for clamping a blank thereon, a notched disk upon the spindle, adapted to turn it, a lever lying along side of the disk and having an arcuate slot adjacent to its periphery, said lever being adapted to move toward or from the axis of the spindle, a pin occupying said slot and adapted to engage a notch in the head, and means for reciprocating the pin.

11. The combination with a cutting tool, of a work holding spindle having a head with a plurality of notches, an arcuate guide adjacent to the edge of the head, a member movable along said guide and adapted to engage a notch of the head or clear it according to the position of the guide, and means for reciprocating said member along said guide for a shorter angular range than the angular distance between the notches in the head.

12. The combination, with a cutting tool, of a work holding spindle, a disk upon the spindle having a pair of diametrically opposed notches, a lever having an arcuate slot adjacent to the periphery of said disk and extending for about a quarter of a circumference, a pin occupying said slot and adapted to engage either notch in the head, means for reciprocating the pin, and means for holding the lever in position.

13. The combination of a spindle, a notched disk upon the spindle, adapted to turn it, an arcuate guide movably mounted adjacent to the periphery of the disk, a member movable along said guide and adapted to engage a notch in the head, means for reciprocating the member, and a locking device adapted to hold said guide in position to maintain said member in the notch, said locking device having means whereby it may be moved to unlock said guide.

14. The combination of a work holding spindle, a notched disk upon the spindle adapted to turn it, a lever having an arcuate slot adjacent to the periphery of the disk, a pin occupying said slot and adapted to engage a notch in the head, means for reciprocating the pin, and a locking device adapted to hold said lever in position to maintain the pin in the notch, said locking device having means whereby it may be moved to unlock said lever.

15. The combination with a cutting tool, of a work holding spindle having a clamping jaw and a disk-like head with a plurality of notches in it, a pivoted lever lying adjacent to the edge of the head and having an arcuate guide, a pin movable along said guide and adapted to engage a notch of the head or clear it according to the position of the lever, said lever having an operating handle, and a lock having a releasing handle adjacent to the handle of the lever.

16. The combination of a cutting tool, of a work holding spindle having a notched head, a pivoted lever lying adjacent to the edge of the head and having a guide, a pin movable along said guide and adapted to engage a notch of the head or clear it according to the position of the lever, said lever having an operating handle, and a lock for holding the lever in operative position and consisting of a bell-crank pivoted to the lever and having one arm adapted to engage a stationary stop and the other arm formed into a releasing handle adjacent to the handle of the lever.

17. In a milling machine the combination with a cutting tool, of a work holding spindle, a continuously moving crank, a reciprocatory pin, a link connecting the same with the crank, and means for moving the pin into and out of connection with the work holding spindle.

18. The combination of a spindle, a notched disk upon the spindle, adapted to turn it, a lever lying alongside of the disk adjacent to its periphery and having an arcuate slot, a pin occupying said slot and adapted to engage a notch in the disk, a crank, and a pitman connecting it with a pin.

19. The combination with a rotary spindle adapted to carry a cutting tool, of a work holding spindle, a chuck carried thereby, adapted to hold a blank on the end of the spindle in position to be engaged by the cutting tool, means extending through the spindle and operable from the other end for clamping or releasing the chuck, a disk on said work spindle having a plurality of notches, a pivoted lever having an arcuate slot adjacent to the edge of the disk, a pin occupying said slot, a crank, a pitman connecting with the pin, and means for latching the lever in position to hold the pin in engagement with the notch.

20. In a milling machine, the combination of a rotary spindle, a cutting tool carried thereby, an oscillatory work spindle, a jaw for clamping a blank on the end of the work spindle, operating means for the jaws including a rod connected with the jaw and extending longitudinally through the work spindle and means for moving the rod, and means for rotating the cutter spindle and for automatically oscillating the work spindle during the cutting operation.

21. The combination with a rotary spindle adapted to carry a cutting tool, of an oscillatory spindle having a positioning plate on its end, a longitudinally movable clamp carried by the oscillatory spindle and extending through the end plate, a longitudinal rod in the oscillatory spindle for operating the clamp, and mechanism for automatically oscillating the said oscillatory spindle during the cutting operation and for feeding the rotary spindle toward it.

22. The combination with a rotary spindle adapted to carry a cutting tool, of an oscillatory spindle, a longitudinal movable clamp carried by the oscillatory spindle and adapted to hold a blank against one end of the spindle, a longitudinal rod in the oscillatory spindle for operating the clamp, a cam carried by said rod adapted to bear against a head yieldingly carried on the other end of the oscillatory spindle, mechanism for automatically oscillating the said oscillatory spindle, and means for feeding the rotary spindle toward it during such oscillation.

23. In a milling machine, the combination of a rotary spindle, a cutter adapted to be carried thereby, a chuck adapted to carry a blank opposite the end of the cutter, means for giving said chuck a rotative movement about an axis parallel with the spindle axis, said cutter and blank coacting during the operation, and an automatic operating mechanism for moving one of them back and forth with reference to the other during the cutting operation.

24. In a milling machine, the combination of a rotary spindle, a cutter adapted to be carried thereby, a chuck adapted to carry a blank opposite the end of the cutter, means for causing the cutter and blank to come into engagement, and mechanism for automatically oscillating one of such members while the other is in engagement therewith.

In testimony whereof I hereunto affix my signature.

GEORGE T. TRUNDLE, Jr.

Witnesses:
J. W. FINIGAN,
GEO. J. EASTERDAY.